US008326847B2

(12) United States Patent
Balmin et al.

(10) Patent No.: US 8,326,847 B2
(45) Date of Patent: Dec. 4, 2012

(54) GRAPH SEARCH SYSTEM AND METHOD FOR QUERYING LOOSELY INTEGRATED DATA

(75) Inventors: Andrey Balmin, San Jose, CA (US); Heasoo Hwang, La Jolla, CA (US); Mir Hamid Pirahesh, San Jose, CA (US); Berthold Reinwald, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 12/053,597

(22) Filed: Mar. 22, 2008

(65) Prior Publication Data
US 2009/0240682 A1  Sep. 24, 2009

(51) Int. Cl.
*G06F 7/00* (2006.01)
*G06F 17/30* (2006.01)
(52) U.S. Cl. .................. 707/754; 707/723; 707/706
(58) Field of Classification Search ............... 707/723, 707/706, 754
See application file for complete search history.

(56) References Cited

U.S. PATENT DOCUMENTS

| 5,774,123 | A  | * | 6/1998  | Matson ........................ 715/854 |
| 5,835,905 | A  | * | 11/1998 | Pirolli et al. ........................ 1/1 |
| 6,434,556 | B1 | * | 8/2002  | Levin et al. ........................ 1/1 |
| 6,598,043 | B1 | * | 7/2003  | Baclawski ........................ 1/1 |
| 6,687,696 | B2 | * | 2/2004  | Hofmann et al. ........................ 1/1 |
| 6,718,365 | B1 | * | 4/2004  | Dutta ........................ 709/203 |
| 6,847,966 | B1 | * | 1/2005  | Sommer et al. ............... 707/739 |
| 6,915,290 | B2 |   | 7/2005  | Bestgen et al. |
| 7,155,441 | B2 |   | 12/2006 | Rising, III et al. |
| 7,184,998 | B2 |   | 2/2007  | Nica |
| 7,293,016 | B1 | * | 11/2007 | Shakib et al. ........................ 1/1 |
| 7,406,669 | B2 |   | 7/2008  | Lindberg |
| 2002/0041713 | A1 | * | 4/2002  | Imagawa et al. ............... 382/229 |
| 2002/0143940 | A1 | * | 10/2002 | Chi et al. ........................ 709/225 |
| 2003/0018584 | A1 | * | 1/2003  | Cohen et al. ..................... 705/52 |
| 2003/0061214 | A1 | * | 3/2003  | Alpha ................................ 707/7 |
| 2003/0220928 | A1 |   | 11/2003 | Durand et al. |
| 2004/0030741 | A1 | * | 2/2004  | Wolton et al. ............... 709/202 |
| 2004/0193593 | A1 | * | 9/2004  | Sacco ................................ 707/3 |
| 2004/0193636 | A1 | * | 9/2004  | Black et al. ................. 707/102 |
| 2004/0220923 | A1 |   | 11/2004 | Nica |
| 2005/0222977 | A1 | * | 10/2005 | Zhou et al. ........................ 707/3 |
| 2005/0262062 | A1 | * | 11/2005 | Xia ................................. 707/3 |
| 2006/0074870 | A1 |   | 4/2006  | Brill et al. |
| 2006/0122993 | A1 |   | 6/2006  | Dettinger et al. |
| 2006/0242138 | A1 | * | 10/2006 | Brill et al. ........................ 707/5 |
| 2007/0124291 | A1 |   | 5/2007  | Hassan et al. |
| 2007/0192306 | A1 |   | 8/2007  | Papakonstantinou et al. |
| 2007/0239691 | A1 | * | 10/2007 | Ordonez et al. ................. 707/3 |

(Continued)

OTHER PUBLICATIONS

U.S. Appl. No. 12/394,371, filed Feb. 27, 2009, Balmin et al.

(Continued)

*Primary Examiner* — Charles Lu
(74) *Attorney, Agent, or Firm* — Jeffrey T. Holman

(57) ABSTRACT

A system, method and computer program product for executing a query on linked data sources. Embodiments of the invention generate an instance graph expressing relationships between objects in the linked data sources and receive a query including at least first and second search terms. The first search term is then executed on the instance graph and a summary graph is generated using the results of the executing step. A second search term is then executed on the summary graph.

11 Claims, 11 Drawing Sheets

U.S. PATENT DOCUMENTS

2007/0239694 A1 10/2007 Singh et al.
2008/0243811 A1 10/2008 He et al.
2008/0281821 A1 11/2008 Chen et al.

OTHER PUBLICATIONS

Assmann, U., "Graph Rewrite System for Program Optimization," *ACM Transactions on Programming Languages and Systems*, vol. 22(4):583-637 (Jul. 2000).

Hwang, H., "Information Discovery in Loosely Integrated Data," *IBM Almaden Research Center*, Sigmod 2007, Jun. 12-14, 2007, Beijing, China.

Lee, C., "Optimizing Large Join Queries Using a Graph Based Approach," *IEEE Transactions on Knowledge and Data Engineering*, vol. 13(2):298-315 (Mar./Apr. 2001).

Hwang, H., "ObjectRank: A System for Authority-Based Search on Databases," SIGMOD 2006, Jun. 27-29, 2006, Chicago, Illinois.

Balmin, A., "ObjectRank: Authority-Based Keyword Search in Databases," 30th VLDB Conference, 2004, Toronto, Canada.

* cited by examiner

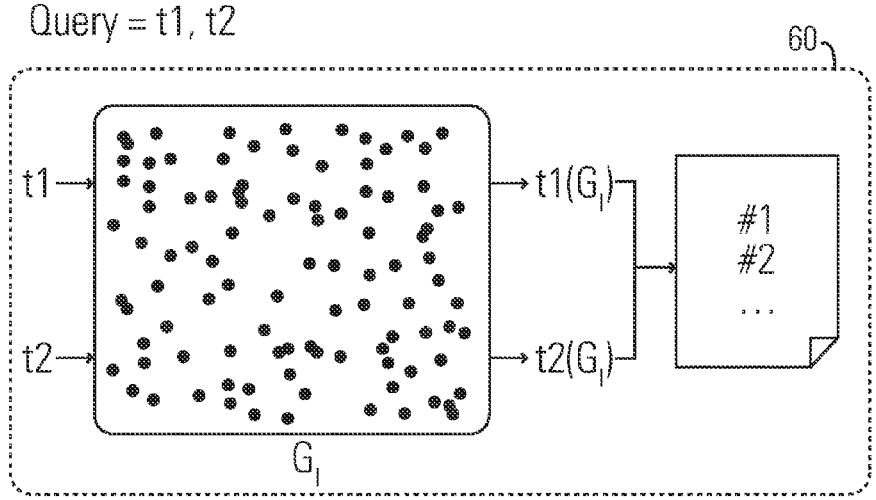
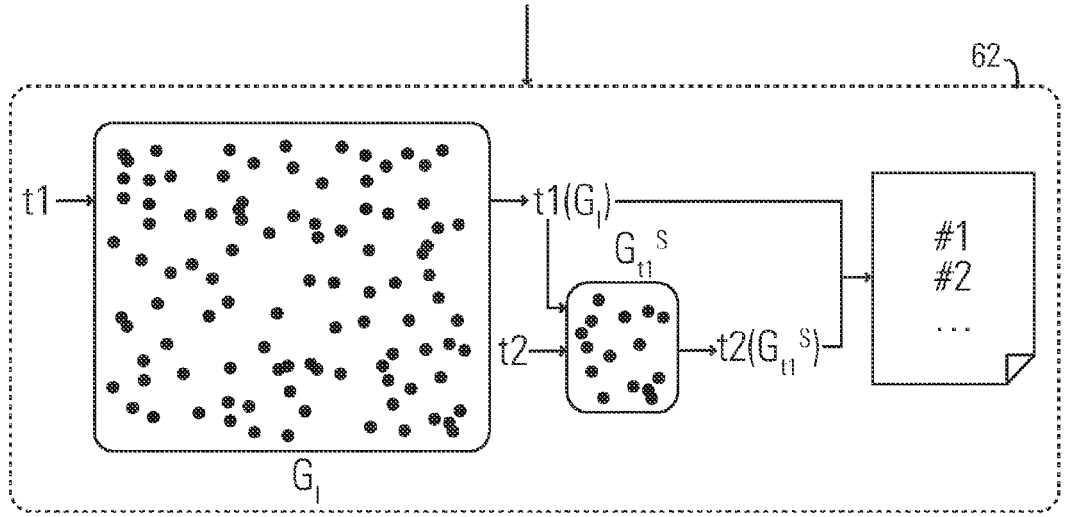
FIG. 4

- Inputs
  - t : a relationship search term
  - ε : convergence threshold
- Observation
  - If $r^t(v) < \varepsilon$, we can consider $r^t(v)$ to be almost zero and so v is not related to t.
- $G_t^S = (V_t^S, E_t^S)$
  - A node v is in $V_t^S$ if $r^t(v) \geq \varepsilon$

(A) Evaluate Q on $G_i$

1 CN=Christina Lee/OU=Santa Teresa/O=IBM
2 LI2052: XML values index
3 CN=Kevin S Beyer/OU=Almaden/O=IBM
4 CN=Fatma Ozcan/OU=Almaden/O=IBM
5 LI2945: XML index runtime support
6 LI4177: XQuery Index Eligibility
7 LI2198: Table partitioning (aka fragmentation data partitioning segmentation composite partitioning)

(B) Evaluate Q using $G_{t1}^S$

1 LI4177: XQuery Index Eligibility
2 CN=Fatma Ozcan/OU=Almaden/O=IBM
3 CN=Kevin S Beyer/OU=Almaden/O=IBM
4 CN=Normen Seemann/OU=Santa Teresa/O=IBM
5 CN=Christina Lee/OU=Santa Teresa/O=IBM
6 LI2945: XML index runtime support
7 CN=Chun Zhang/OU=Almaden/O=IBM

(C) Evaluate Q using $G_{t1}^{S++}$

1 CN=Christina Lee/OU=Santa Teresa/O=IBM
2 CN=Fatma Ozcan/OU=Almaden/O=IBM
3 LI2052: XML values index
4 CN=Kevin S Beyer/OU=Almaden/O=IBM
5 LI2945: XML index runtime support
6 LI4177: XQuery Index Eligibility
7 CN=Chun Zhang/OU=Almaden/O=IBM

- Performance: Much better
  - $|Gt1S| = 150 = 0.4\%$ of $|G|$
  - $|Gt1S++| = 150 + 90$ aggrNodes
- Quality: Better
  - The quality of (B) is better than (A)
  - Top 20 of (A) and (B)
    - 12 overlap
  - Top 20 of (A) and (C)
    - 17 overlap

FIG. 8

| Overlap / Generality | BS(t1) is almost contained in BS(t2) | $|BS(t1) \cap BS(t2)| \sim= 0$ |
|---|---|---|
| $|BS(t1)| << |BS(t2)|$ | Better quality | |
| $|BS(t1)| >> |BS(t2)|$ | Better quality | |
| $|BS(t1)| \sim= |BS(t2)|$ (big) | Similar quality | Similar quality |
| $|BS(t1)| \sim= |BS(t2)|$ (small) | Similar quality | Better quality but, $G_{t1}^{S++}$ is the best |

[Comparison of $t1(G_i)$, $t2(G_{t1}^S)$ vs. $t1(G_i)$, $t2(G_i)$]

*FIG. 9*

GRAPH SEARCH SYSTEM AND METHOD FOR QUERYING LOOSELY INTEGRATED DATA

FIELD OF INVENTION

The present invention generally relates to information retrieval, and particularly to systems and methods for querying linked data sources.

BACKGROUND

The exponential growth in the amount and accessibility of data has raised many challenges in the field of information search and retrieval. These challenges are compounded by the heterogeneous nature of real world data, which may exist in a structured, semi-structured or unstructured state. The goal of much research has been the automatic or semiautomatic discovery of common entities and relationships across such disparate kinds of data. This may be done, for example, by crawling thousands of data sources, for example, on networks such as the internet. Another factor in the complexity of information search and retrieval is the multitude of ways of situational integration of data. One way to deal with these challenges is by using extensible data structures and creative ways for data retrieval across disparate data sources. In the case of the internet, one example is by crawling thousands of data sources and using search engines to index the crawled web documents.

One approach to information retrieval is to model data as graphs of objects connected by relationships. However, it is not easy to formulate precise, yet flexible queries that will find different meaningful connections between objects in such graphs. Standard database query languages, such as XQuery, are too rigid, and require full knowledge of the database schema from the user. Conventional search systems have very limited functionality and typically only find objects that contain all the keywords in a search.

An example of a query which illustrates the difficulties in dealing with relationships across disparate data is as follows. Consider a product manager looking for employees in a certain department who somehow (directly or indirectly) contributed to a shipped product. One approach may be to take the product plan data coming from a content repository and dynamically combine it with the company employee data to find employees. The product manager expects to find employees who, for example, owned components of the product, developed components, or consulted employees on the development of components.

For the above-described search, the product manager is looking for data retrieval with "high recall" rather than "high precision", which is usually the case with users of search engines. Since large amounts of data may be related to the query, it is important to be able to perform the search quickly and efficiently and to be able to summarize the results, for example, by identifying the highest ranking objects and relationships individually, and aggregating the less important ones.

Another challenge is in finding efficient and user-friendly ways to represent the results of the search, where the results may be voluminous and complex.

Accordingly, there is a need for improved systems that can search across large volumes of heterogeneous, real world data. There is also a need for ways to formulate precise, yet flexible queries that will find meaningful connections between data objects. There is also a need for such techniques which are fast and do not require full knowledge of the database schema.

SUMMARY OF THE INVENTION

To overcome the limitations in the prior art briefly described above, the present invention provides a method, computer program product, and system for supporting flexible querying of graph datasets.

In one embodiment of the present invention, a method of executing a query on linked data sources comprises: generating an instance graph expressing relationships between objects in the linked data sources; receiving a query including at least first and second search terms; executing the first search term on the instance graph; generating a summary graph using the results of the execution; and executing the second search term on the summary graph.

In another embodiment of the present invention, a method of finding relationships between objects in a database comprises: generating an instance graph expressing relationships between objects in the linked data sources; receiving a query including at least first and second search terms; executing a first search term in a query by using the first term as a filter to derive a subset of the database; performing a relationship search that ranks each object in the instance graph with respect to the subset; generating a summary graph using the results of the execution; and executing the second search term on the summary graph.

In another embodiment of the present invention, a system comprises: a plurality of databases; a query processor coupled to a databases, the query processor having a filter module which receives a query including a relationship search term; and a relationship search engine coupled to the query processor and receiving an instance graph from one of the databases, the relationship search engine processes the relationship search term on the instance graph to determine a ranking of objects in the instance graph that indicates how related the objects are to the relationship search term.

In a further embodiment of the present invention, a computer program product comprising a computer usable medium having a computer readable program, wherein the computer readable program when executed on a computer causes the computer to: generate an instance graph expressing relationships between objects in the linked data sources; receive a query including at least first and second search terms; execute the first search term on the instance graph; generate a summary graph using the results of the execution; and execute the second search term on the summary graph.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there are described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 4 shows a diagram of the generation of summary graphs by the query processing system shown in FIG. 2, in accordance with an embodiment of the invention;

FIG. 8 shows exemplary search results generated using the query processing system shown in FIG. 2, in accordance with on embodiment of the present invention;

FIG. 9 shows a chart of the quality of search results generated using the query processing system shown in FIG. 2 for various classes of data, in accordance with on embodiment of the present invention;

DETAILED DESCRIPTION OF THE INVENTION

The present invention overcomes the problems associated with the prior art by teaching a system, computer program product, and method for processing queries. Embodiments of the present invention comprise a graph search system that answers queries consisting of keyword and structured predicate filters, and a fuzzy object search operator that exploits the link structure between data objects to rank objects related to the result of a filter. Embodiments of the invention also generate summary graphs, consisting of individual and aggregate nodes of the data graph that are related to the objects in the query results. Summary graphs are also used in some embodiments for presenting query results to the user. Embodiments of the invention use summary graphs to evaluate subsequent queries efficiently without considering all the nodes and links in the original data graph. Executing a subsequent query on a summary graph of the first query is not only faster than executing both queries on the full data graph, but also produces better quality results in many cases. In particular, embodiments of the invention efficiently execute of complex graph queries by heuristically rewriting the query into an ordered list of sub-queries. Only the first sub-query is executed on the full data graphs, while the rest are executed on the summary graphs produced by the previous sub-query.

In contrast, prior systems such as standard database query languages and conventional search systems without the above-described features could not easily formulate queries that would find meaningful connections between objects in complex graphs containing many types of objects and relationships.

Figure 1:
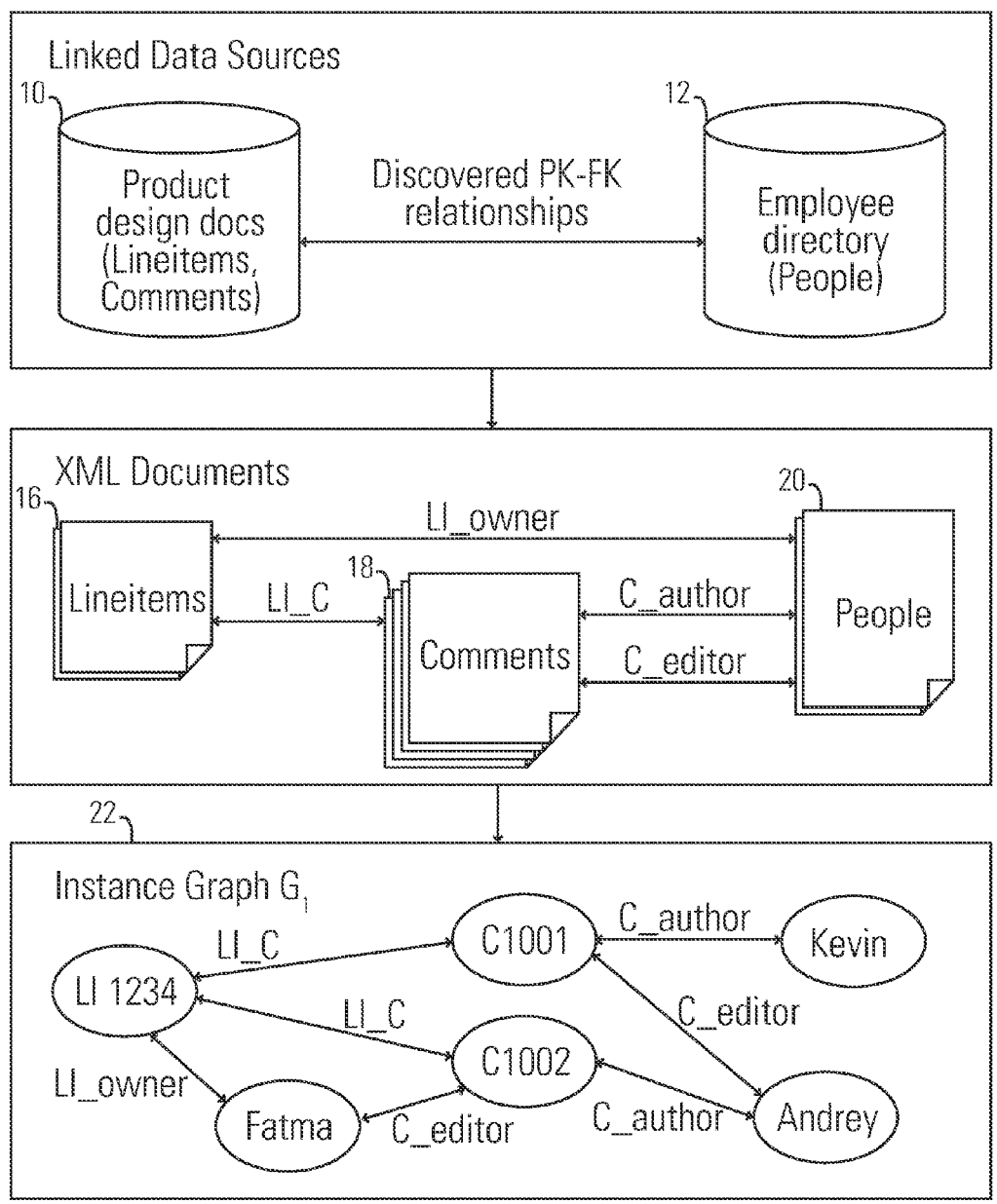
FIG. 1 shows a diagram of the process of construction an instance data graph from independent linked data sources having a set of XML documents including three kinds of data objects and their relationships, in accordance with an embodiment of the invention.

FIG. 1 shows a diagram of the process of constructing an instance data graph from independent linked data sources having a set of XML documents including three kinds of data objects their relationships in accordance with an embodiment of the invention. In this embodiment, there are two independent relational databases, however, the present invention may be employed with more than or less than this number of databases. A product design database 10 contains the description of product features, which are also referred to herein as "lineitems". An employee database 12 includes the company organigram, work locations, etc. This embodiment of the invention utilizes a data integration phase that analyses the databases, performs entity resolution, and identifies data objects and relationships. In particular, the present invention assumes that primary key to foreign key (PK-FK) relationship between the two databases 10 and 12 has already been established.

FIG. 1 also shows a schema 14 of the three types of objects found in the databases 10, 12: People 20, LineItems 16, and Comments 18. There are four types of relationships between these three types of objects. Ownership of a LineItem, labeled "LI_owner", indicates which Person owns the LineItem. Comments which belong to a LineItem, labeled "LI_C", indicate that a particular comment relates to a LineItem. Comments may be written by a Person and this relationship is labeled "C_author". Comments may also be answered by a person and this relationship is labeled "C_editor".

Instance graph 22, labeled "$G_1$", is a flexible way of modeling the data in the databases 10, 12. Instance graph 22 shows particular line items 16, comments 18 and people 20.

In this embodiment, queries of the following nature are processed, although many other kinds of queries may be processed:

Find the by people who work at the IBM Almaden Research Center who are related to "index" and "eligibility". The purpose of such a search may be to find people who are connected in some way to line items, "index" and "eligibility", which may be product features of DB2.

In accordance with an embodiment of the invention, a query language is defined that combines filter terms with a relationship search operator, ~, that traverses the edges of the instance graph. The invention may use three types of filters to subset the data objects: keyword, object type, and XPath expression. A filter term returns a set of data object IDs that satisfy the condition. For example, <lineitem> is a filter term that selects all lineitem objects, and /person/location [text( )="Almaden"] is a filter term that finds all the person entries with location "Almaden".

A relationship search operator, ~, is also defined that uses the edges between data objects in the instance graph 22. Given a subset of nodes of the graph (the result of a filter term), a relationship search operator "~" calculates the rank of each node in the graph with respect to the subset. A relationship search term is composed of a relationship search operator followed by the filter term that selects its input subset of data objects. For example, ~/person/location[text( )="Almaden"] is a relationship search term that ranks all the objects in the dataset based on the strength of their relationships to Almaden people. Using this Query language, we can formulate the above query, with the three filters separated by commas, as:

$Q$="index","eligibility",/person/location[text( )="Almaden"]

The filter ~"index", for example, finds the documents that mention the word "index" and also finds all the objects that are closely related to this word. "Related" in this context means that the object is well connected in a graph. In the present embodiment, this filter "~" may be a fuzzy object search operator implemented using an algorithm such as the random walk algorithm called "ObjectRank", which is described in Andrey Balmin et al. "ObjectRank: Authority-Based Keyword Search in Databases", VLDB 2004: pages 564-575, the contents of which are incorporated by reference in their entirety. It will be appreciated by those skilled in the art that the filter "~" may be implemented using other algorithms, including, but not limited to other random walk algorithms and other fuzzy object search algorithms.

Figure 2:
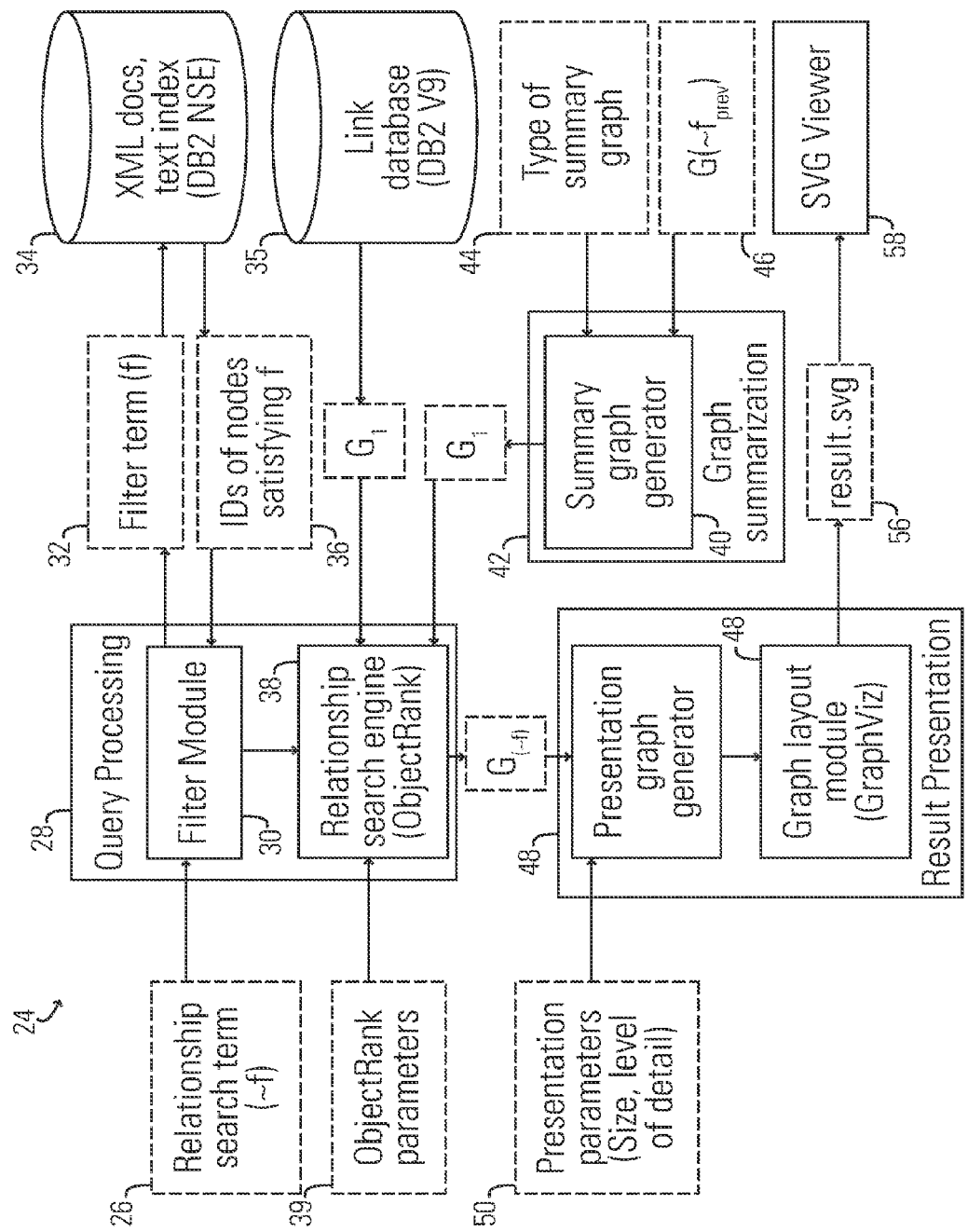
FIG. 2 shows the architecture of a query system for processing a query and for generating the instance data graph shown in FIG. 1, in accordance with an embodiment of the invention.

FIG. 2 shows the architecture of a query system 24 for processing a query in accordance with an embodiment of the invention. This query system 24 may be implemented in a number of platforms, such as a commercial DBMS (IBM DB2®V9). Other database management systems, may be used particularly those which support native persistence of XML documents and querying XML documents using XPath and keyword containment predicates. A query containing relationship search term 26 is received by a query processing unit 28 using a filter module 30. The filter module generates filter terms 32 which are sent to XML documents in a database 34. In the above example query the XML documents are first queried to find all Person objects that have work location "Almaden". The result is a set of nodes 36 that satisfy the filter terms, which is sent back to the filter module 30. These nodes of qualifying objects are used as a base set for the relationship search engine 38, which in the present embodiment, uses the base set as starting points of random walks on the instance graph $G_I$, derived from a link database 35. The result is a ranking of all the objects in the graph based on the probability that a random walk visits the object at a given moment. The random walks computation may be implemented using the iterative ObjectRank algorithm, which receives ObjectRank parameters 39.

The system 24 computes relationship searches not only on the original instance graph $G_I$, but also on summary graphs $G_S$ produced from results of prior queries. The summary graph is produced by a summary graph generator 40 that is part of a graph summarization unit 42, which receives information regarding the type of summary graph 44 and summary graphs from prior queries 46. The summary graph $G_S$ is generated by a summary of a query and consists of all the objects that have a score above a certain threshold and possibly aggregate objects. As explained in more detail below, an aggregate object is constructed from a set of objects of the same type that share relationships to objects already in the summary graph. All individual objects that form an aggregate object have scores below the threshold, but if the sum of their scores surpasses the threshold, the aggregate qualifies for the result. It has been observed that for related search terms, characterized by high overlap of base sets, running the relationship search on the summary graphs, instead of the full instance graph, improves both the system performance and the quality of the result, as described in more detail below.

The query processing unit 28 generates an output instance graph $G_{(-f)}$ that identifies the top-K highest ranked objects. This instance graph $G_{(-f)}$ may be used to create a presentation graph that serves two purposes: (1) provide some context to result objects and (2) show the strength of references from other objects. In particular, the presentation graph may be produced by a presentation unit 48, which receives the instance graph $G_{(-f)}$ as well as information regarding the desired presentation parameters 50 and uses a presentation graph generator 52 and a graph layout module 54 to generate results 56 that may be viewed on a scalable vector graphics (SVG) viewer 58, as described below and shown in FIG. 10.

The use of summary graphs will now be explained in more detail. It will be appreciated that the instance graph, such as instance graph 22 shown in FIG. 1, may have a large number of nodes. A random walk algorithm, such as ObjectRank, will generally require a significant amount of processing time, which may be prohibitive with a large number of nodes. To improve the quality of the results and to minimize the processing time, we use a summary graph to minimize the number of nodes that the ObjectRank algorithm needs to process. The basic idea in accordance with an embodiment of the invention is where a query contains a number of search terms, one of the terms is selected to be run first, a summary graph is created based on the results of the first term and then run the next search term on the summary graph and not on the entire instance graph.

Figure 3:
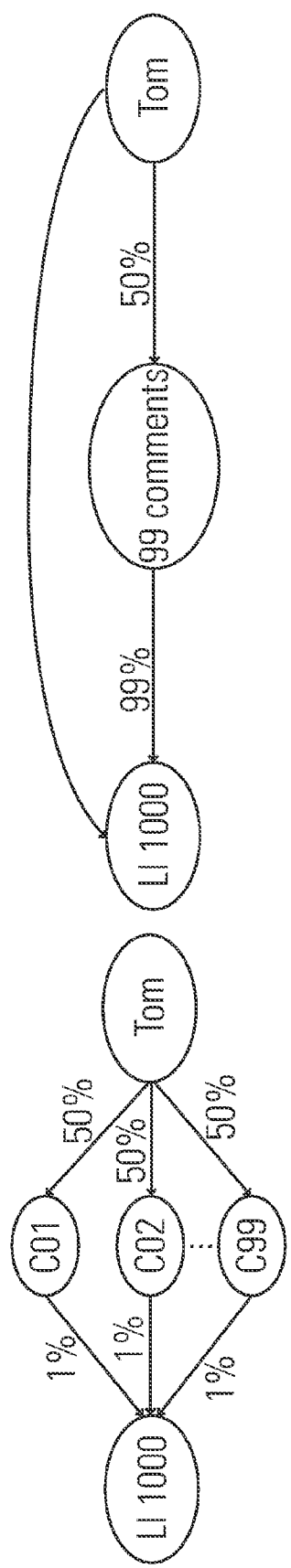
FIG. 3 shows a diagram of how nodes are aggregated in the query processing system shown in FIG. 2, in accordance with an embodiment of the invention.

In some embodiments of the invention, the summary graph may be created using aggregate nodes, which enables the system to capture important sources hidden behind multiple insignificant sources. One way to create aggregate nodes is shown in FIG. 3, which shows an exemplary portion of instance graph 22. We see 99 nodes of the same type, labeled C01, C02, . . . , C99. Each of these nodes indicates a comment mate by Tom that relates to line item LI1000. While the comment nodes individually, may not be important enough to exceed a threshold and to be picked up by the ObjectRank algorithm, clearly, in the aggregate, Tom is meaningful to LI1000 because he wrote 99 comments relating to it. This embodiment of the invention consolidates each of these comment nodes into a single comment node labeled "99 comments". These nodes can all be lumped together because they all have the same relationship to the important nodes, LI1000 and Tom. When the random walk algorithm processes the aggregated nodes in the summary graph, the results will be the same because Tom is still considered to be just as important as if the nodes for the 99 comments were processed separately.

In accordance with embodiments of the invention, this aggregation process may be done before the processing of a query term, or after, or both. In particular, there are a number of advantages when aggregation is performed after the processing of a query term and before the processing of a next query term. FIG. 4 shows this process in more detail. In particular, FIG. 4 shows two different ways of processing two query terms t1 and t2 using the query system 24. In the first process 60 both query terms t1 and t2 are processed using the ObjectRank algorithm with the full instance graph $G_I$. The query system 24 will produce two sets of results: a score of how related each object is to t1 and a score of how related each object is to t2. These two scores for each object may be processed multiplied (or some other operation) and processed as shown in FIG. 2.

In the second process 62 in FIG. 4, only the first term t1 is processed on the full instance graph $G_I$. The results of the processing of the first term are then used to generate a summary graph $G_{t1}^S$, which is a subset of $G_I$. This summary graph will only include nodes which are sufficiently important, or have some relation to t1. Depending on the data, this may likely reduce the size of the graph substantially. The result is that t2 is run on only the summary graph, which reduces processing time significantly because, for example, the computationally expensive random walk is done on a much smaller graph for t2. Also, as described below, the quality is as good as or better with this process 62 than it is with the previous process 60.

Figure 5:
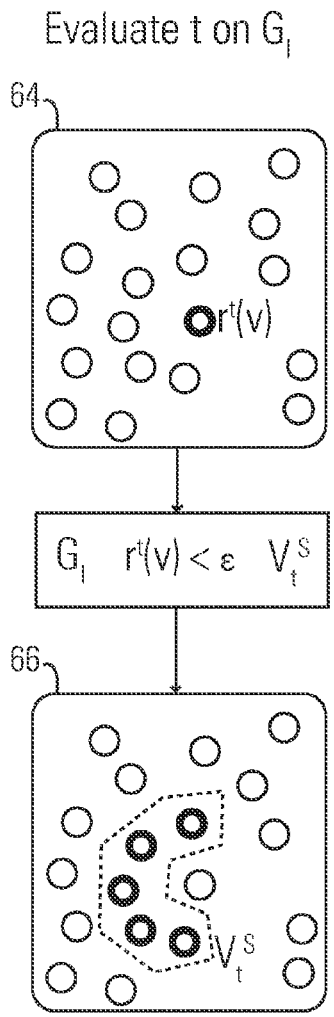
FIG. 5 shows another diagram of the generation of summary graphs by the query processing system shown in FIG. 2, in accordance with an embodiment of the invention.

FIG. 5 shows additional details of the creation of a summary graph, such as the one shown in FIG. 4. A search t is evaluated on an instance graph $G_I$ 64. This means we perform the random walk for all the nodes in $G_I$ with respect to how they are related to t1. This process determines those nodes with a rank "r" that exceeds a threshold "ε". All the edges from the original graph $G_I$ that connected these nodes are then used to create summary graph 66 ($G_t^S$). In FIG. 5, E is used to designate edges and V is used to designate vertices.

Figure 6:
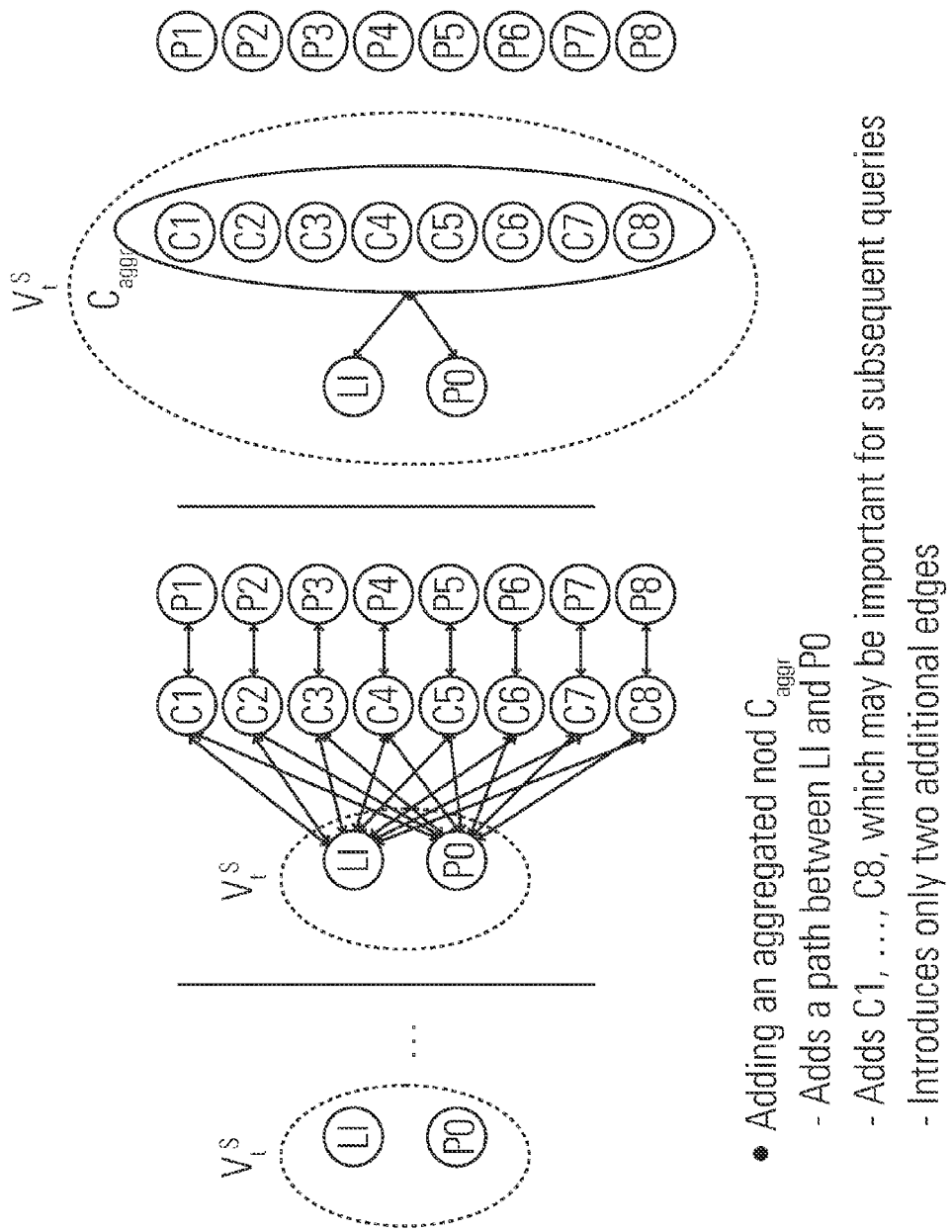
FIG. 6 shows an exemplary process of aggregating nodes using the query processing system shown in FIG. 2, in accordance with one embodiment of the present invention.
Figure 7:
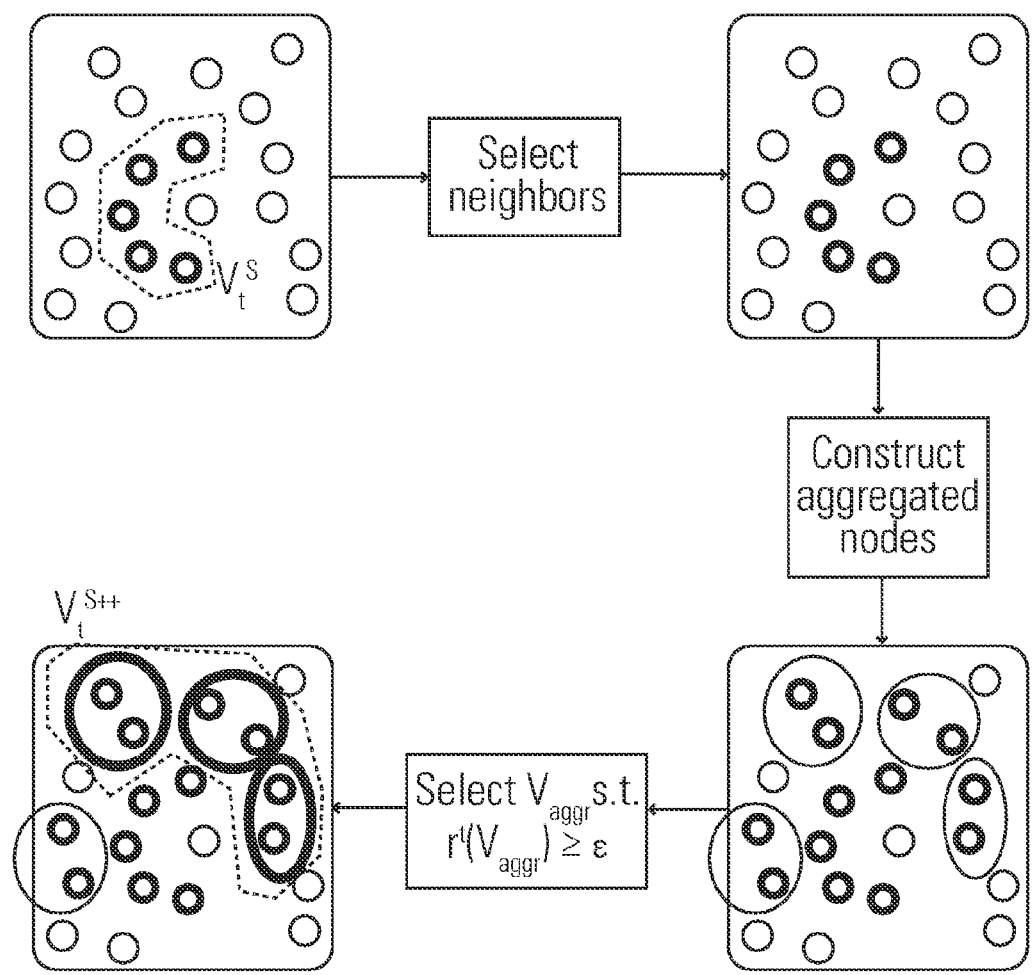
FIG. 7 shows an exemplary process of constructing aggregated nodes using the query processing system shown in FIG. 2, in accordance with one embodiment of the present invention.

FIG. 6 shows another way to create summary graphs in accordance with embodiments of the invention. In general, this technique adds nodes on the fringes of nodes to improve search quality. The added nodes may not have been included in the summary graph, but actually do provide important information. For example, as shown in FIG. 6, the vertices in a summary graph are designated $V_t^S$. We observe that person P0 made 8 comments that relate to line item LI. These comments were not important enough individually to be included in the summary graph. We can aggregate these 8 nodes into a single node $C_{aggr}$ and add that node to the summary graph creating aggregated summary graph with vertices $V_t^{S++}$. This adds a significant amount of information, which improves search quality while only introducing two new edges. Another illustration of this process is shown in FIG. 7 where three aggregate nodes are created and added to the summary graph.

FIG. 8 shows results of processing the above-described query:

Q=~"index",~"eligibility",/person/location[text
  ( )="Almaden"]

This query Q is evaluated in three different ways, labeled A, B and C. In method A, both terms t1 ("eligibility") and t2("index") are evaluated on the entire instance graph $G_I$. In method B, only the term t1 is evaluated on the entire instance graph. The term t2 is evaluated on a much smaller summary graph, $G_{t1}^S$, which is derived from the results of the evaluation of t1. The summary graph is much smaller, in part, because the term "eligibility" does not appear in very many documents. In method C, the term t1 is evaluated on the entire instance graph, while t2 is evaluated on the aggregated summary graph $G_{t1}^{S++}$.

Performance is improved in method B as compared to method A because for t2, the random walk is performed on a smaller summary graph consisting of only 150 nodes, which is 0.4% of the number of nodes in the original instance graph. In method C performance is also improved, but not as much because the random walk is performed on the 150 nodes in the summary graph used in method B, plus 90 additional aggregated nodes.

The quality of the query result with method B is also better than method A. In method A the best result, is "LI4177: XQuery Index Eligibility" because it contains both search terms, t1 and t2. However, method A ranked this object #6, while method B ranked this same result as #1.

FIG. 9 shows a table indicating the expected results of using method B versus method A for different base sets (BS). The base set BS(t1) is defined as the number of occurrences of t1 in the databases from which the instance graph is derived, while BS(t2) is the number of occurrences of t2 in this database. It can be seen that in cases where BS(t1) is much smaller than BS(t2), and BS(t1) is almost contained in BS(2), better quality results can be expected. The example in FIG. 8 was an illustration of this. The expected results for different combinations of these variables are shown in FIG. 9.

Figure 10:
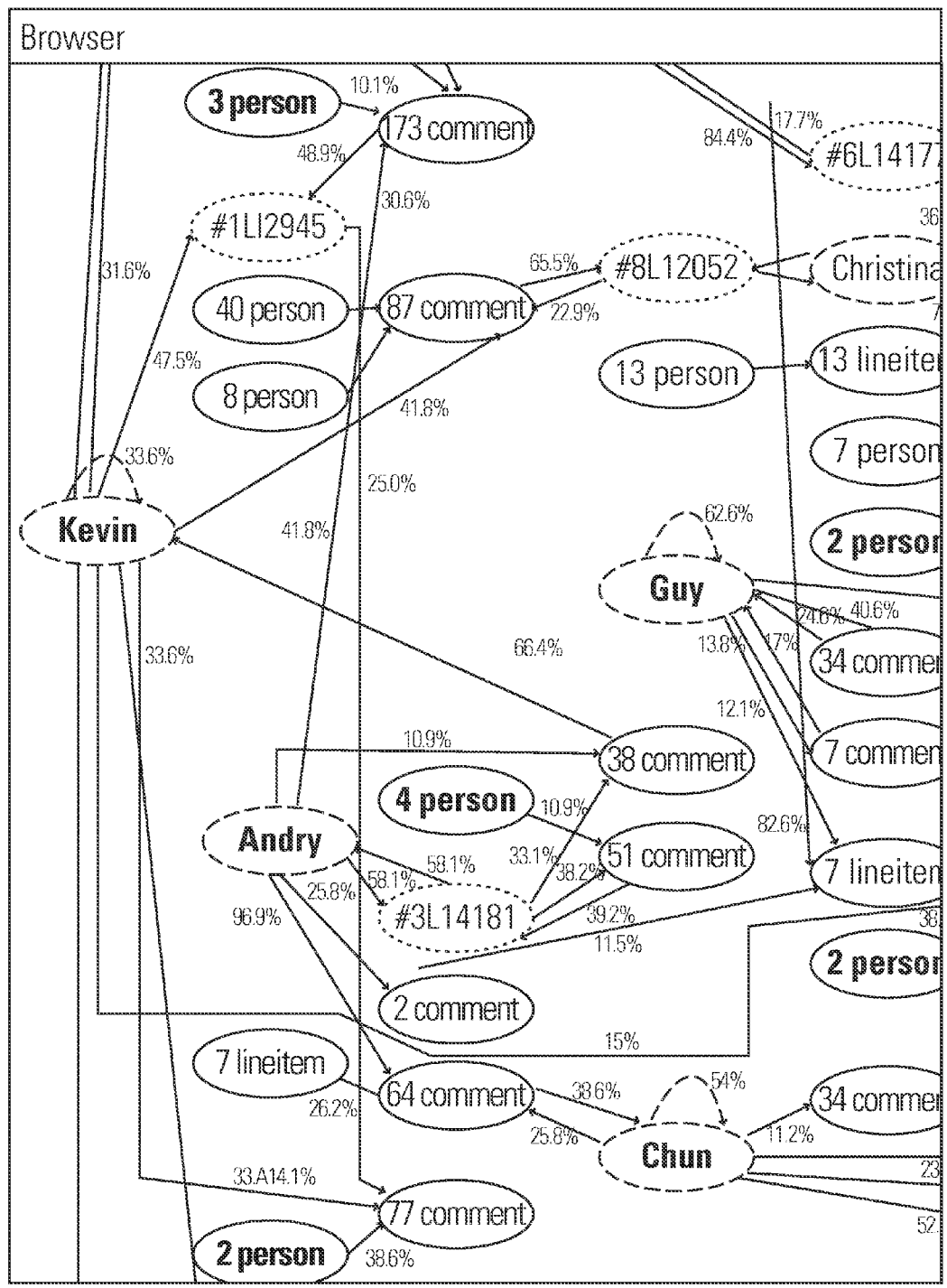
FIG. 10 shows a result presentation graph generated by the query processing system shown in FIG. 2, in accordance with an embodiment of the invention.

FIG. 10 shows a presentation graph which provides a quick visual representation of the results of the operation of the query system 24 on a query. This presentation graph is designed to serve two purposes: to provide some context to result objects; and to show the strength of references from other objects. The result presentation graph for a query is similar to the query used in the examples discussed above. The result objects of the query are shown by the dotted ovals where the nodes in the graph are labeled with "#X". "X" indicates the rank of the object. Thus, "#1 LI2945" is the top result for this query. The dashed ovals show nodes for important people, comments, and lineitems that tightly relate to the result objects. Finally, we include aggregated nodes into the result presentation graph if we need to display important nodes that are transitively referenced by many less important nodes. For example, we discover the strong connection between "Kevin" and lineitem "#8 LI2052" by constructing the aggregate node "387 comments" that aggregates 387 comments answered by Kevin on the lineitem. The label of a node that passes the filter term is shown in bold letters. Thus, the label "Kevin" is in bold letters because the node passes the "Almaden" filter predicate. The weight on the edge from "Kevin" to "#1 LI2945" indicates that 47.5% of the score of "LI2945" is due to the relationship with "Kevin". The weight of the self edge of "Kevin" node corresponds to the impact of the fact that the node satisfies the filter term on its score.

The presentation graph shown in FIG. 10 is well suited for providing the "big picture" view of the query result by immediately showing clusters of closely-connected people and lineitems. They also show important objects that were neither in the base set nor in the final result, but that are highly scored by the ObjectRank algorithm. Thus, the presentation graph essentially pre-fetches objects that are likely to be navigated by a user while further exploring the query result.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Current examples of optical disks include compact disk-read-only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 11:
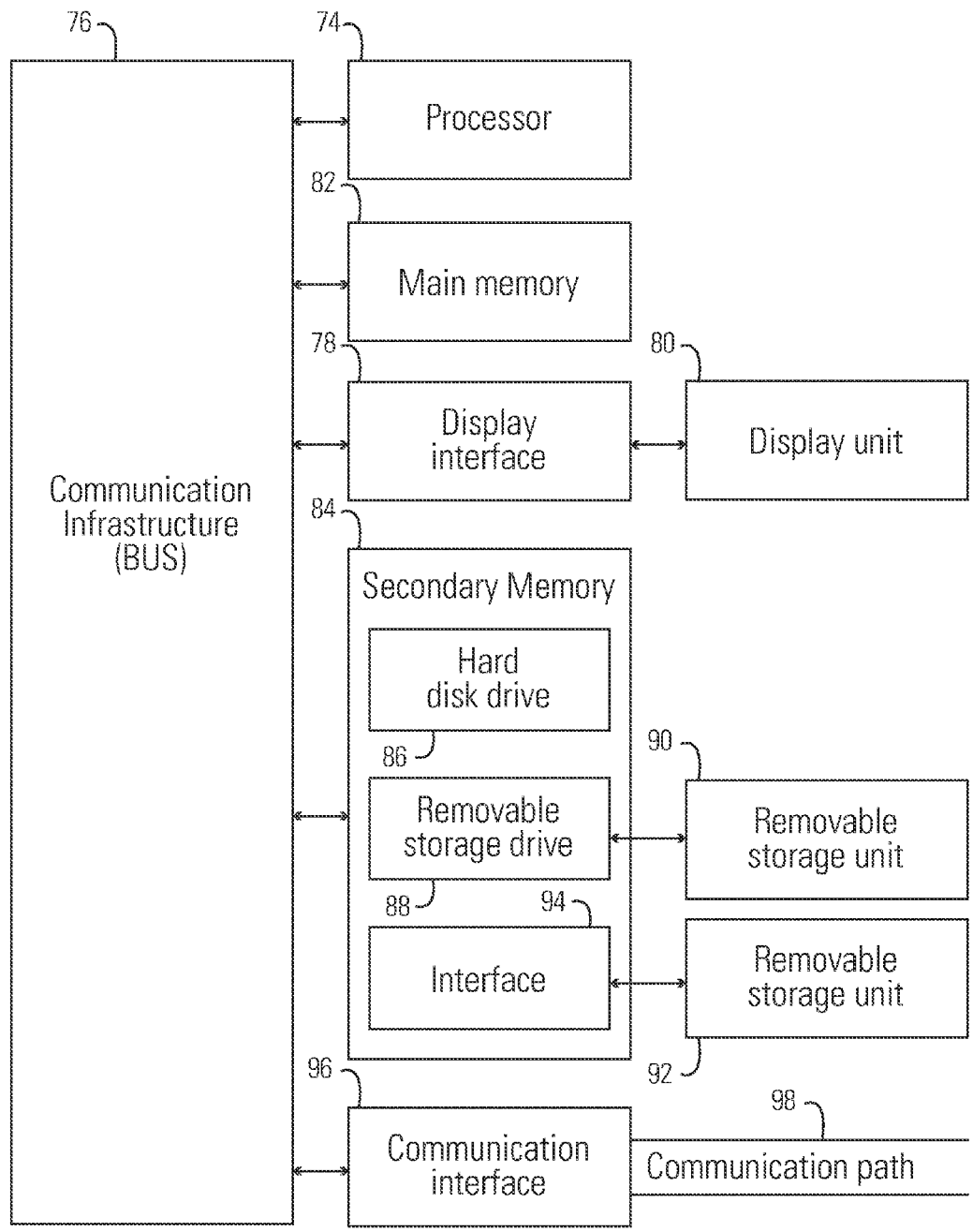
FIG. 11 shows a high level block diagram of an information processing system useful for implementing one embodiment of the present invention.

FIG. 11 is a high level block diagram showing an information processing system useful for implementing one embodiment of the present invention. The computer system includes one or more processors, such as processor 74. The processor 74 is connected to a communication infrastructure 76 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 78 that forwards graphics, text, and other data from the communication infrastructure 76 (or from a frame buffer not shown) for display on a display unit 80. The computer system also includes a main memory 82, preferably random access memory (RAM), and may also include a secondary memory 84. The secondary memory 84 may include, for example, a hard disk drive 86 and/or a removable storage drive 88, representing, for example, a floppy disk drive, a magnetic tape drive, or an optical disk drive. The removable storage drive 88 reads from and/or writes to a removable storage unit 90 in a manner well known to those having ordinary skill in the art. Removable storage unit 90 represents, for example, a floppy disk, a compact disc, a magnetic tape, or an optical disk, etc. which is read by and written to by removable storage drive 88. As will be appreciated, the removable storage unit 90 includes a computer readable medium having stored therein computer software and/or data.

In alternative embodiments, the secondary memory 84 may include other similar means for allowing computer programs or other instructions to be loaded into the computer system. Such means may include, for example, a removable storage unit 92 and an interface 94. Examples of such means may include a program cartridge and cartridge interface (such as that found in video game devices), a removable memory chip (such as an EPROM, or PROM) and associated socket, and other removable storage units 92 and interfaces 94 which allow software and data to be transferred from the removable storage unit 92 to the computer system.

The computer system may also include a communications interface 96. Communications interface 96 allows software and data to be transferred between the computer system and external devices. Examples of communications interface 96 may include a modem, a network interface (such as an Ethernet card), a communications port, or a PCMCIA slot and card, etc. Software and data transferred via communications interface 96 are in the form of signals which may be, for example, electronic, electromagnetic, optical, or other signals capable of being received by communications interface 96. These signals are provided to communications interface 96 via a communications path (i.e., channel) 98. This channel 98 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 82 and secondary memory 84, removable storage drive 88, and a hard disk installed in hard disk drive 86.

Computer programs (also called computer control logic) are stored in main memory 82 and/or secondary memory 84. Computer programs may also be received via communications interface 96. Such computer programs, when executed, enable the computer system to perform the features of the present invention as discussed herein. In particular, the computer programs, when executed, enable the processor 74 to perform the features of the computer system. Accordingly, such computer programs represent controllers of the computer system.

From the above description, it can be seen that the present invention provides a system, computer program product, and method for the efficient execution of complex graph queries. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method of executing a query on linked data sources comprising:
    generating an instance graph expressing relationships between objects in said linked data sources;
    receiving a query including at least two terms;
    rewriting, heuristically, the query into an ordered list of sub-query terms, wherein the ordered list begins with first and second search terms;
    executing, with a processor, said first search term on said instance graph, wherein the execution outputs an execution result subset and wherein said executing said first search term further comprises performing a relationship search that ranks each object in said instance graph with respect to said execution result subset;
    generating a summary graph using the execution result subset, wherein objects having a score below a predetermined threshold are filtered out of said summary graph during said relationship search;
    aggregating to said summary graph two or more of said filtered out objects which are related to at least one object having a score above said predetermined threshold; and
    executing said second search term on said summary graph.

2. The method of claim 1 wherein said relationship search uses a fuzzy search operator to derive said summary graph and wherein said summary graph indicates how closely related an object in said linked data sources is to said first and second search terms.

3. The method of claim 1 wherein said relationship search uses a random walk to derive said summary graph and wherein said summary graph indicates how closely related an object in said linked data sources is to said first and second search terms.

4. The method of claim 1 wherein said relationship search uses an ObjectRank method to derive said summary graph and wherein said summary graph indicates how closely related an object in said linked data sources is to said first and second search terms.

5. The method of claim 1 further comprising generating a presentation graph from said summary graph that visually displays clusters of related objects in said linked data sources.

6. A method of finding relationships between objects in a database comprising:

generating an instance graph expressing relationships between the objects in said database;

receiving a query including at least two terms;

rewriting, heuristically, the query into an ordered list of sub-query terms, wherein the ordered list begins with first and second search terms;

executing, with a processor, the first search term in a query, wherein said executing derives a subset of said database;

performing a relationship search that ranks each object in said instance graph with respect to said subset;

filtering out the objects of said relationship search, wherein each filtered out object has a score below a predetermined threshold;

generating a summary graph using the subset of said executing;

aggregating to said summary graph two or more of said filtered out objects which are related to at least one object having a score above said predetermined threshold; and executing said second search term on said summary graph, wherein the execution outputs second subset.

7. The method of claim 6 wherein said received query includes a third search term and further comprising executing said third search term on the results of said second subset.

8. The method of claim 6 wherein said performing a relationship search comprises performing a random walk.

9. The method of claim 6 wherein said performing a relationship search comprises using an ObjectRank method.

10. The method of claim 6 further comprising generating a presentation graph from said summary graph that visually displays clusters of related objects in said linked databases.

11. A computer program product comprising a computer readable storage medium having a computer readable program, wherein said computer readable program when executed on a computer causes said computer to:

generate an instance graph expressing relationships between objects in linked data sources;

receive a query including at least two terms;

rewrite, heuristically, the query into an ordered list of sub-query terms, wherein the ordered list begins with first and second search terms;

execute said first search term on said instance graph, wherein the executing outputs execution result subset and wherein, said executing further comprises performing a relationship search that ranks each object in said instance graph with respect to said execution result subset;

filter out the objects of said relationship search, wherein each filtered out object has a score below a predetermined threshold;

generate a summary graph using the execution result subset;

aggregate to said summary graph two or more of said filtered out objects which are related to at least one object having a score above said predetermined threshold; and execute said second search term on said summary graph.

* * * * *